United States Patent
Zakaria et al.

(10) Patent No.: US 10,212,692 B2
(45) Date of Patent: Feb. 19, 2019

(54) ENHANCED PAGING IN 4G LTE MOBILE SATELLITE SYSTEMS

(71) Applicant: Hughes Network Systems, LLC, Germantown, MD (US)

(72) Inventors: Gaguk Zakaria, College Park, MD (US); Channasandra Ravishankar, Clarksburg, MD (US)

(73) Assignee: Hughes Network Systems, LLC, Germantown, MD (US)

(*) Notice: Subject to any disclaimer, the term of this patent is extended or adjusted under 35 U.S.C. 154(b) by 0 days.

(21) Appl. No.: 15/894,908

(22) Filed: Feb. 12, 2018

(65) Prior Publication Data
US 2018/0234943 A1 Aug. 16, 2018

Related U.S. Application Data

(60) Provisional application No. 62/457,751, filed on Feb. 10, 2017.

(51) Int. Cl.
*H04W 68/00* (2009.01)
*H04W 68/02* (2009.01)
*H04W 76/10* (2018.01)

(52) U.S. Cl.
CPC ......... *H04W 68/02* (2013.01); *H04W 68/005* (2013.01); *H04W 76/10* (2018.02)

(58) Field of Classification Search
CPC . H04W 28/0289; H04W 76/12; H04W 24/02; H04W 68/00; H04W 68/02; H04W 7/1853
See application file for complete search history.

(56) References Cited

U.S. PATENT DOCUMENTS

| 5,103,459 A | 4/1992 | Gilhousen et al. |
| 6,279,132 B1 | 8/2001 | Linsky et al. |
| 6,292,658 B1 | 9/2001 | Kim |

(Continued)

OTHER PUBLICATIONS

International Search Report and Written Opinion dated Jun. 18, 2018 by the International Searching Authority (European Patent Office) in PCT Application PCT/US2018/017888.

*Primary Examiner* — Ronald Eisner
(74) *Attorney, Agent, or Firm* — NovoTechIP International PLLC (57) ABSTRACT

Enhanced paging for an LTE mobile satellite system (MSS-LTE) network, including determining that a user terminal (UT) is in a second state in which the UT has established a Non-Access Stratum (NAS) protocol signaling connection with the network and an active Radio Resource Control protocol (RRC) connection with the network; determining, as a result of the UT being inactive while the UT is in the second state, that the UT is in a third state in which the UT maintains the NAS connection and releases or suspends the RRC connection; receiving a request to establish a multimedia session with the UT; transmitting, in response to receiving the request and the UT being in the third state, an E-RAB SETUP REQUEST including a priority value indicating the session is suitable for a high penetration alerting procedure; receiving the E-RAB SETUP REQUEST; and in response to receiving the E-RAB SETUP REQUEST, transmitting a high penetration alert signal to the UT.

18 Claims, 7 Drawing Sheets

(56) References Cited

U.S. PATENT DOCUMENTS

| | | |
|---|---|---|
| 6,763,240 B1 | 7/2004 | Chambers et al. |
| 7,440,763 B2 | 10/2008 | Lundsjo et al. |
| 2002/0052180 A1 | 5/2002 | Ravishankar et al. |
| 2002/0123347 A1 | 9/2002 | Chambers et al. |
| 2007/0140186 A1 | 6/2007 | Picot et al. |
| 2010/0128722 A1 | 5/2010 | Madour et al. |
| 2011/0075655 A1 | 3/2011 | Sahin et al. |
| 2012/0044867 A1 | 2/2012 | Faccin et al. |
| 2013/0028175 A1 | 1/2013 | Jong et al. |
| 2013/0217422 A1 | 8/2013 | Zakaria et al. |
| 2013/0315164 A1 | 11/2013 | Arur et al. |
| 2014/0022983 A1 | 1/2014 | Ravishankar et al. |
| 2014/0045492 A1 | 2/2014 | Zakaria et al. |
| 2014/0064124 A1* | 3/2014 | Paladugu ............... H04W 76/19 370/252 |
| 2014/0093008 A1 | 4/2014 | Jong et al. |
| 2015/0052360 A1 | 2/2015 | Ravishankar et al. |
| 2017/0085329 A1 | 3/2017 | Ravishankar et al. |
| 2017/0366251 A1* | 12/2017 | Ravishankar ...... H04B 7/18513 |
| 2018/0013484 A1 | 1/2018 | Vasavada et al. |

* cited by examiner

FIG. 5 ial Patent Application Ser. No. 62/457,751, filed on
ENHANCED PAGING IN 4G LTE MOBILE SATELLITE SYSTEMS

REFERENCE TO A RELATED APPLICATION

This application claims the benefit of priority from U.S. Provisional Patent Application Ser. No. 62/457,751, filed on Feb. 10, 2018, and entitled "ENHANCED PAGING IN 4G LTE MOBILE SATELLITE SYSTEMS."

BACKGROUND

The present application relates generally to the field of Mobile Satellite Systems (MSS), and, in particular, to enhanced paging techniques in mobile satellite communication systems (MSS).

The majority of terrestrial cellular communications systems have evolved to LTE/4G-LTE systems and beyond with a focus on Internet Protocol (IP) Multimedia services based on Session Initiation Protocol (SIP). SIP is an application level signaling protocol widely used for creating, managing, and terminating real-time multimedia sessions, such as voice calls, video conferencing, and instant messaging in an IP based network. SIP is used for signaling between a user terminal (UT) and the IP Multimedia Subsystem (IMS) as well as between the entities within the IMS. The IMS is a key element in the LTE/4G-LTE architecture that makes it possible to provide ubiquitous cellular access to a wide range of services provided by the Internet, including multimedia, email, and video conferencing. In line with terrestrial evolution, there is interest in evolving MSS to LTE/4G-LTE systems and beyond.

In contrast to a terrestrial cellular communications system, typical MSS operations require line of sight (LOS) with a satellite. Typically, when a UT of an MSS user is inside a building and there is an incoming multimedia session, the UT is unable to receive (and as a consequence, not respond to) an ordinary paging signal. To attempt to overcome this, an enhanced paging technique called "alerting" (which may be referred to as "high penetration alerting" or "HPA" utilizing a "high penetration alerting signal" to convey a "high penetration alert message," or "high penetration paging" utilizing a "high penetration paging signal" to convey a "high penetration paging message") may be invoked to notify a UT and a user of the UT of an incoming communication. Examples of alerting are described in U.S. Patent Application Publication Numbers 2014/0045492 (published on Feb. 13, 2014 and entitled "SYSTEM AND METHOD FOR ENHANCED PAGING AND QUALITY OF SERVICE ESTABLISHMENT IN MOBILE SATELLITE SYSTEMS") and 2014/0093008 (published on Apr. 3, 2014 and entitled "SYSTEM AND METHOD FOR IMPROVED WAVEFORM AND ENHANCED RECEIVER ALGORITHM FOR HIGH PENETRATION ALERTING IN A MOBILE SATELLITE COMMUNICATIONS SYSTEM"), which are incorporated by reference herein in their entireties. Alerting is expensive in terms of satellite communication resources (for example, power and/or bandwidth) needed to reach the users, therefore, there is a desire by MSS operators to use enhanced paging only for specific services such as voice. Information about the type of service is indicated inside a SIP message. However, a satellite base station subsystem (SBSS) entity responsible for paging and alerting user terminals cannot practically read the content of SIP messages, since SIP signaling is compressed and/or encrypted by IMS elements before it reaches SBSS.

There is a need for an enhanced paging (alerting) in MSS-implemented LTE/4G-LTE (which may be referred to as "MSS-LTE") communications to reach users in disadvantaged areas such as inside a building. Specifically, there is a need for a system and method to enhance paging penetration and use such techniques judiciously to conserves and efficiently utilize limited satellite communication resources.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This disclosure provides systems and methods whereby an SBSS is configured to selectively invoke alerting for specific incoming multimedia sessions (which may be referred to as "mobile-terminated sessions"). In LTE/4G-LTE, signaling for creating multimedia sessions is based on SIP and signaling to and from a UT is handled by a Proxy-Call Session Control Function (P-CSCF) residing in an IMS Core Network (CN). An IMS CN may also be referred to as an "IMS." A UT may also be referred to as a "user equipment" or "UE." Furthermore, to save the over-the-air bandwidth, SIP messages between the UT and P-CSCF are compressed. Also, in LTE/4G LTE, the SIP signaling does not go through a Mobility Management Entity (MME) where the paging is initiated when a mobile terminal is in the EPS Connection Management (ECM) state ECM-Idle. This disclosure also provides a new state for the RRC (Radio Resource Control) layer, RRC Satellite Tracking Area-PCH (STA-PCH). The RRC STA-PCH state may be considered a substrate of the RRC-Connected state. For a UT in the STA-PCH state, the SBSS, where the paging is initiated, does not have direct visibility of a traffic type in a compressed SIP message. Hence, without the described systems and methods, the SBSS cannot selectively initiate enhanced paging either for a UT in the ECM-Idle state or a UT in the RRC STA-PCH state.

This disclosure provides systems and methods that enable a MSS-LTE SBSS to selectively perform enhanced paging for a UT in the ECM-Idle state or a UT in the RRC STA-PCH state. These results are achieved by utilizing aspects of the network initiated dedicated bearer activation feature defined in 3GPP LTE release 9 and beyond. The dedicated bearer creation involves interaction between P-CSCF, PCRF (Policy and Charging Rules Function), PGW (PDN (or Packet Data Network) Gateway), SGW (Serving Gateway), and MME that eventually will allow the MME to, without inspection of compressed SIP messages, selectively identify new incoming multimedia sessions for which enhanced paging may be invoked. As a result of these interactions, the dedicated bearer creation will also allow SBSS, without inspection of compressed SIP messages, to selectively identify new incoming multimedia sessions for which enhanced paging may be invoked.

In some implementations, there are two UT conditions where the enhanced paging for a new incoming multimedia session may be invoked: (1) a UT is in the ECM-Idle state, and (2) a UT is in the RRC STA-PCH state. In the ECM-Idle state, the UT does not have an S1 connection with an MME in the core network. Here, the MME will page the UT before sending a dedicated bearer activation request to UT. For such MME initiated paging, the MME notifies the SBSS on suitability of alerting for a multimedia session in a Paging Priority IE (information element) of an S1AP (S1 Application Protocol) Paging message. In the RRC STA-PCH state, the UT has an S1 connection with a core network (for example, with an MME), but in terms of RRC state between the SBSS and the UT, the UT is idle. In the RRC STA-PCH state, the MME will send a E-RAB SETUP REQUEST to the UT; however, the SBSS will page the UT before sending the E-RAB SETUP REQUEST to the UT. For such SBSS initiated paging, the SBSS will be able to identify a suitability of high penetration alerting for a multimedia session from the E-RAB SETUP REQUEST that is sent by MME to the SBSS. This is further explained with the help of FIGS. 1-4B.

Figure 1:
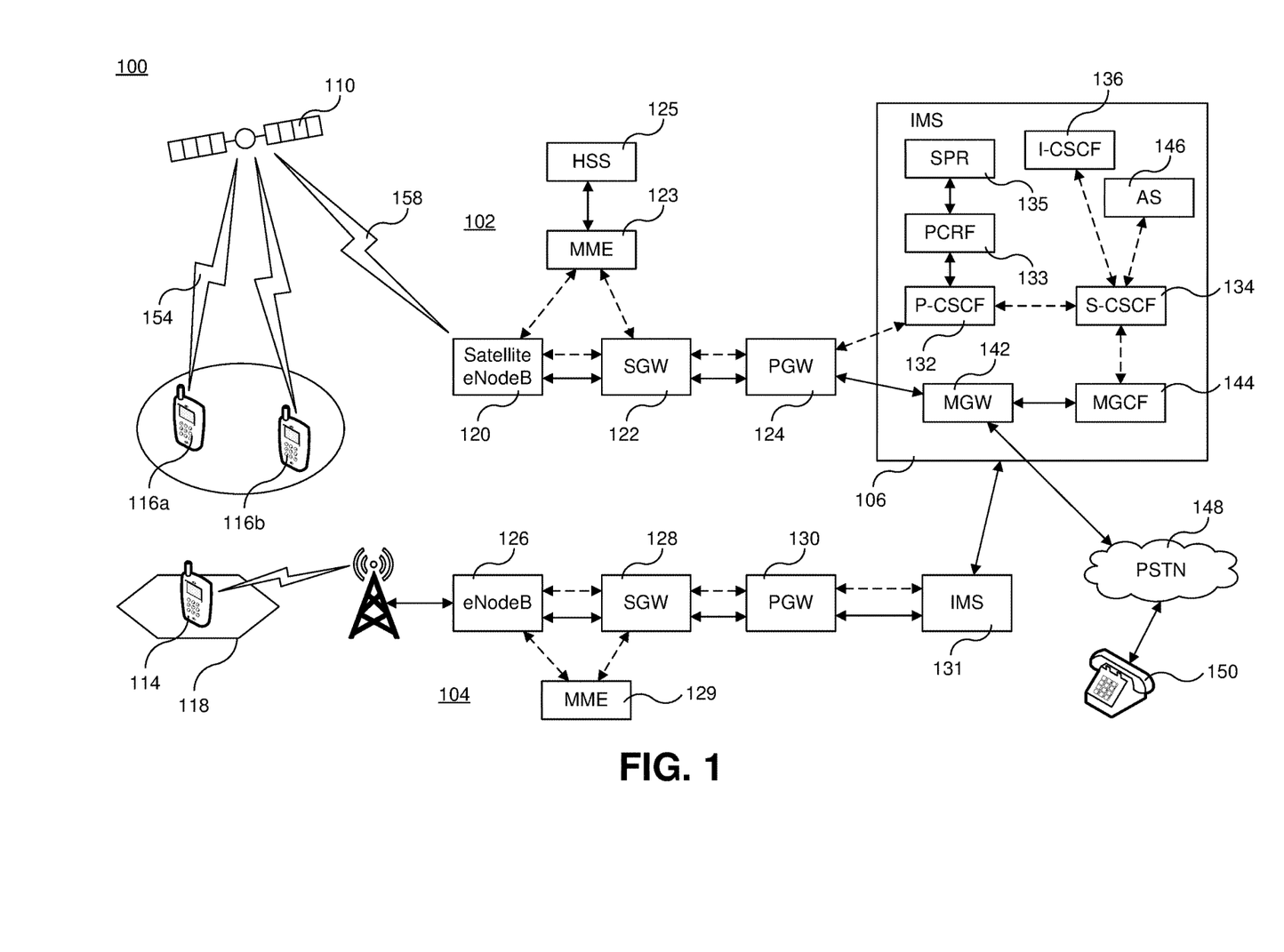
FIG. 1 illustrates an example MSS-LTE network including a satellite network, a 3GPP IP Multimedia Subsystem (IMS) Core Network (CN), and connections to other networks such as a PSTN (Public Switched Telephone Network) and a terrestrial mobile network.

FIG. 1 illustrates an example MSS-LTE network 100 including a satellite network 102, 3GPP IP Multimedia Subsystem (IMS) Core Network (CN) 106, and connections to other networks such as a PSTN (Public Switched Telephone Network) 148 and a terrestrial mobile network 104. As illustrated in FIG. 1, the MSS-LTE network 100 includes the satellite network 102, the terrestrial mobile network 104, and the IMS CN 106. Satellite network 102 includes a satellite 110 and user terminals (UT) 116*a* and 116*b*, both of which are in a coverage region of a satellite beam 108 transmitted by the satellite 110. In this example, the UTs 116*a* and 116*b* include a cell phone and/or other mobile communication device configured for communication via satellite 110 via communication network signals 154. The satellite network 102 also includes a satellite eNodeB 120, an SGW 122, and a PGW 124 connecting the IMS CN 106 with the UTs 116*a* and 116*b* via the satellite 110. The satellite eNodeB 120 and the SGW 122 are in communication with an MME 123, and an HSS 125 is in communication with the MME 123. The satellite eNodeB 120 and/or the satellite 110 may be included in a satellite base station subsystem (SBSS) included in the satellite network 102.

Examples of SBSS communications and operation are described in U.S. Patent Application Publication Numbers 2013/0028175 (published on Jan. 31, 2013 and entitled "METHOD AND SYSTEM OF PROVIDING EFFICIENT PACKETIZED VOICE COMMUNICATIONS AND DATA BEARERS IN MOBILE SATELLITE SYSTEMS"), 2014/0022983 (published on Jan. 23, 2014 and entitled "METHOD AND SYSTEM FOR PROVIDING A SATELLITE INTERFACE TO SUPPORT MOBILE COMMUNICATION SERVICES"), 2015/0052360 (published on Feb. 19, 2015 and entitled "METHOD AND SYSTEM FOR PROVIDING ENHANCED DATA ENCRYPTION PROTOCOLS IN A MOBILE SATELLITE COMMUNICATIONS SYSTEM"), 2017/0085329 (published on Mar. 23, 2017 and entitled "HIGH SPEED, HIGH TERRESTRIAL DENSITY GLOBAL PACKET DATA MOBILE SATELLITE SYSTEM ARCHITECTURES"), 2017/0366251 (published on Dec. 21, 2017 and entitled "APPROACHES FOR HIGH SPEED GLOBAL PACKET DATA SERVICES FOR LEO/MEO SATELLITE SYSTEMS"), and 2018/0013484 (published on Jan. 11, 2018 and entitled "APPARATUS AND METHOD FOR NETWORK LEVEL SYNCHRONIZATION IN MULTIPLE LOW EARTH ORBIT (LEO) SATELLITE COMMUNICATIONS SYSTEMS"), which are incorporated by reference herein in their entireties.

The terrestrial mobile network 104 includes a UT 114, which is in a coverage region of a cell site 118. In this example, the UT 114 is embodied as a cell phone device. An eNodeB 126 transfers multimedia content UT 114 to IMS 131 via an SGW 128 and a PGW 130. The eNodeB 126 and the SGW 128 are connected to the MME 129. IMS CN 106 is also connected to a telephone 150 via a Public Switched Telephone Network (PSTN) 148. IMS 131 and IMS 106 communicate with each other when UT 114 is communicating with UT 116*a* or UT 116*b*.

IMS CN 106 includes a P-CSCF 132, a Serving Call Session Control Function (S-CSCF) 134, a PCRF 133, a Subscription Profile Repository (SPR) 135, an Interrogating-Call Session Control Function (I-CSCF) 136, a Media Resource Function Controller (MRFC) 138, a Media Gateway (MGW) 142, a Media Gateway Controller Function (MGCF) 144 and an Application Server (AS) 146. However, for other applications, IMS CN 106 may include different components. Except for aspects described herein, the components of MSS 100 illustrated in FIG. 1 operate as known in the art (for example, according to the 3GPP standards); therefore, other aspects of these components are not discussed in detail in this description. Examples of such aspects and operations are described in 3GPP TS 23.203, 3GPP TS 23.401, 3GPP TS 24.008, 3GPP TS 24.229, 3GPP TS 29.212, 3GPP TS 29.213, 3GPP TS 29.214, 3GPP TS 36.300, and 3GPP TS 36.314, which are incorporated by reference herein in their entireties. Furthermore, for the convenience of discussion and illustration, only some of the components of the IMS CN 106 related to SIP signaling are illustrated in FIG. 1.

The eNodeB 120 is configured to communicate with satellite 110 via a network signal 158. The eNodeB 120 is also configured to communicate with SGW 122. SGW 122 interfaces with PGW 124, which interfaces with the IMS CN 106. Specifically, PGW 124 interfaces with the P-CSCF 132 and the MGW 142. For SIP signaling, the P-CSCF 132 is the first point of contact for the UT terminals 116*a* and 116*b* (which may also be referred to as "IMS terminals") and is configured to receive and process SIP signaling packets. Some of the non-limiting functions of the P-CSCF 132 include subscriber authentication, inspecting all signaling from the UTs 116*a* and 116*b*, compression and decompression of SIP messages, encryption and decryption of SIP messages, policy decision function including Quality of Service (QoS) and generating charging records. A QoS profile includes different QoS parameters such as, but not limited to, bit rate, error rate, and transfer delay. In a LTE/4G-LTE network, each bearer is characterized by a QoS Class Identifier (QCI), which is used as a mechanism to ensure bearer traffic is allocated appropriate QoS. Different bearer types receive different QoS and therefore different QCI values. A QoS profile may also include an Allocation and Retention Policy (ARP) value, an integer ranging from 1 to 15 (with 1 being the highest level of priority) used when determining whether to create a new EPS bearer and/or remove an existing EPS bearer. Different QCI and/or ARP levels can be assigned to different service flows.

The S-CSCF 134 is the central node of the signaling plane and is configured to perform session control in addition to being a SIP server. Some of the non-limiting functions of S-CSCF 134 include handling SIP registration (which allows it to bind a user location and a SIP address), inspecting all signaling messages of the locally registered users, providing routing services, enforcing network operator policies, and deciding to which application server (for example, the AS 146) the SIP messages will be forwarded in order to provide their services. The I-CSCF 136 is configured to forward SIP requests or responses to S-CSCF 134 and operates as another SIP function located at the edge of an administrative domain. The MGW 142 and the MGCF 144 function as a PSTN gateway to communicate with PSTN 148. The MGCF 144 is a SIP endpoint and is configured to perform call control protocol conversion.

Typically, LTE/4G-LTE IMS uses SIP based signaling. All the signaling to and from UTs 116a and 116b go through P-CSCF 132. Since most of the SIP messages are large, 3GPP recommends that SIP messages between UTs 116a and 116b and P-CSCF 132 are compressed to save over-the-air bandwidth. As a result, gateways between the UTs 116a and 116b and the P-CSCF 132, namely SGW 122, PGW 124, and SBSS (for example, satellite eNodeB 120) will not be able to inspect, at least without decompression, the content of compressed and/or encrypted SIP messages between the UTs 116a and 116b and the P-CSCF 132, or determine if a multimedia session is for voice, fax, video, or something else based on such inspection.

When IMS 106 receives signaling for a new media session directed to UT 116a (or another UT served by the LTE/4G-LTE), this signaling might not be delivered directly to UT 116a, depending on the state of the UT 116a, such as an ECM state or an RRC state. If the UT 116a is in the ECM-Idle state, the MME 123 will initiate paging to the UT 116a before delivering the signaling message, since in the ECM-Idle state the MME 123 does not have an S1 connection with the UT 116a. If the UT 116a is in the RRC STA-PCH state, the SBSS will initiate paging to the UT 116a before delivering the signaling message, since the UT 116a is not in an active RRC state. In either of these paging situations, the UT 116a might, at a time that a paging signal is transmitted by the satellite 110, not receive an ordinary paging signal due to the UT 116a operating in disadvantaged conditions, including being in a disadvantaged location (for example, in a building) and/or a disadvantaged environment (for example, with sources of interference).

Paging may be performed using a high penetration alerting signal to increase a probability, in comparison to use of an ordinary paging signal, that a UT operating in disadvantaged conditions receives the signal. According to a first alerting technique, a high penetration alerting signal is used by the satellite 110 with an increased amplitude in comparison to an ordinary paging signal transmitted by the satellite 110. In some implementations of the first alerting technique, various degrees or levels of increase in amplitude may be selectively applied (for example, +5 dB, +10 dB, and +15 dB). In a second alerting technique, a high penetration alerting signal is transmitted with a different waveform or coding scheme than an ordinary paging signal. For example, an increased amount of FEC (forward error correction), a different coding technique, and/or a different modulation technique may be applied. In some implementations of the second alerting technique, various degrees or levels of change in waveform or coding scheme may be selectively applied; for example, an amount of increased FEC. In a third alerting technique, a high penetration alerting signal is transmitted by the satellite 110 using a different channel and/or frequency than the satellite 110 uses for ordinary paging signals. In a fourth alerting technique, the satellite 110 is used to transmit ordinary paging signals, but a different satellite or satellite constellation is used transmit high penetration alerting signal. For example, satellite 110 may be a GEO (geostationary earth orbit) or MEO (medium earth orbit) satellite, and a LEO (low earth orbit) satellite or constellation of satellites may be used to transmit a high penetration alerting signal. A high penetration alerting signal may be transmitted according to the first, second, third, and/or fourth alerting techniques. Use of the high penetration alerting signal may successfully address link margin issues for a UT operating in disadvantaged conditions.

Selective use of alerting is desirable to improve utilization of limited satellite transmission resources. However, the SBSS, which controls when alerting is performed, is not configured to inspect compressed and/or encrypted SIP messages to identify multimedia sessions for which alerting is suitable. Yet, the P-CSCF 132 has ready access to the uncompressed and unencrypted content of the SIP messages that it receives. The P-CSCF 132 is configured to inspect SIP messages for new multimedia sessions (for example, by inspecting SIP INVITE messages) to determine when a multimedia session is suitable for alerting, and then convey that determination to the SBSS via PGW 124 and SGW 122.

In response to receiving a SIP INVITE message containing a Session Description Protocol (SDP) message, P-CSCF 132 will trigger a series of operations and communications among P-CSCF 132, PCRF 133, PGW 124, SGW 122, and MME 123 that identify multimedia sessions suitable for alerting to the SBSS. This identification begins with P-CSCF 132 providing an initial identification to the PCRF 133 in a Reservation-Priority AVP (attribute-value pair), MPS-Identifier AVP, and/or other Rx protocol AVP, which is conveyed via a QCI value, an ARP value, and/or another QoS parameter value to the MME 123, which conveys the identification to the SBSS via other messages. If the MME 123 initiates paging to a UT 116a in response to the UT 116a being in the ECM-Idle state, the identification is conveyed in a Paging Priority IE of a Paging issued by MME 123 to the SBSS. If the UT 116a is in the RRC STA-PCH mode, the MME 123 conveys the identification to the SBSS in E-RAB Level QoS Parameters of an E-RAB SETUP REQUEST, such as in a QCI value, an ARP value, and/or another QoS parameter value. The SBSS is configured to process the identification conveyed by the MME 123 and use high penetration alerting as circumstances demand for suitable multimedia sessions.

Figure 2A:
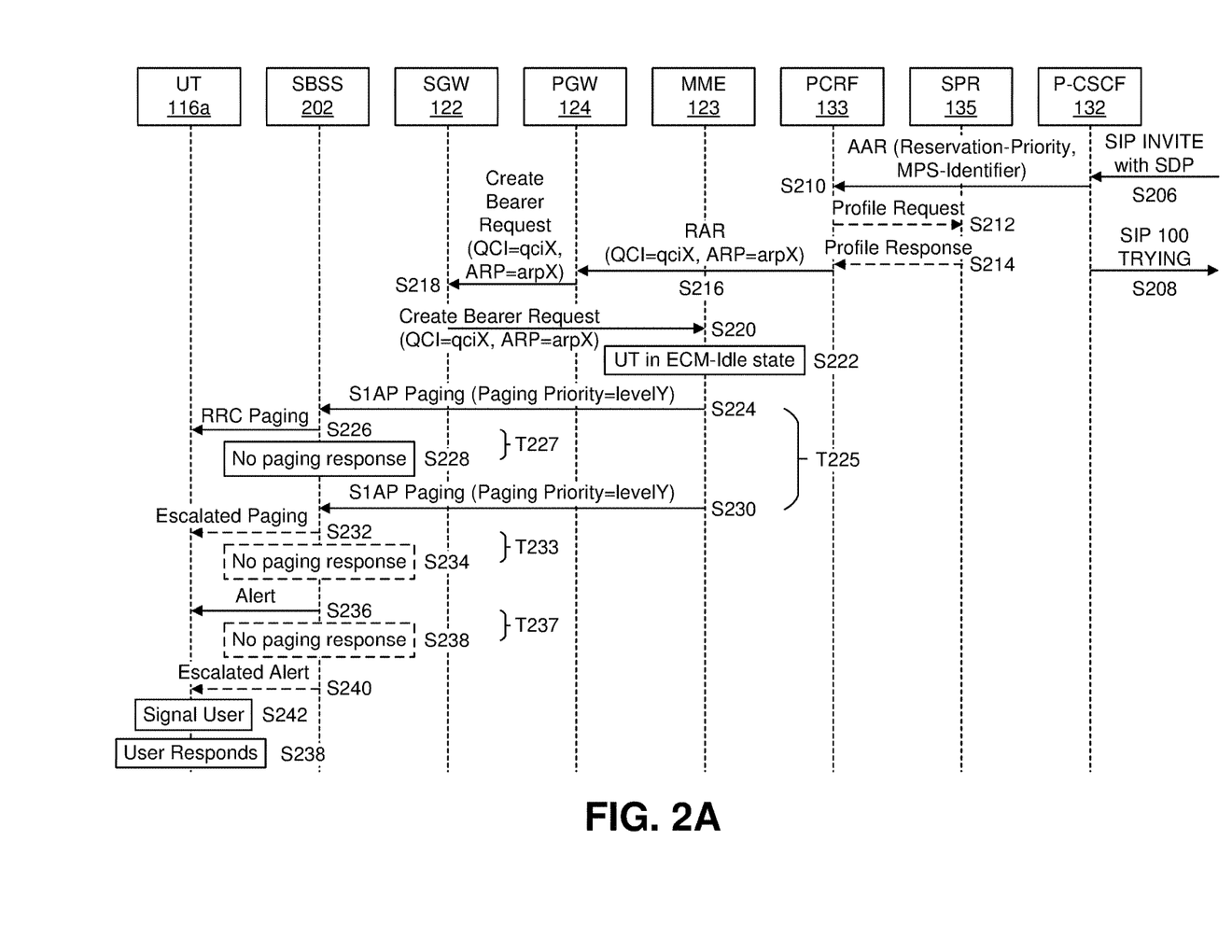
FIGS. 2A and 2B illustrate an example of components of the MSS-LTE network shown in FIG. 1 operating to perform alerting when a user terminal (UT) is in an ECM-Idle state.
Figure 2B:
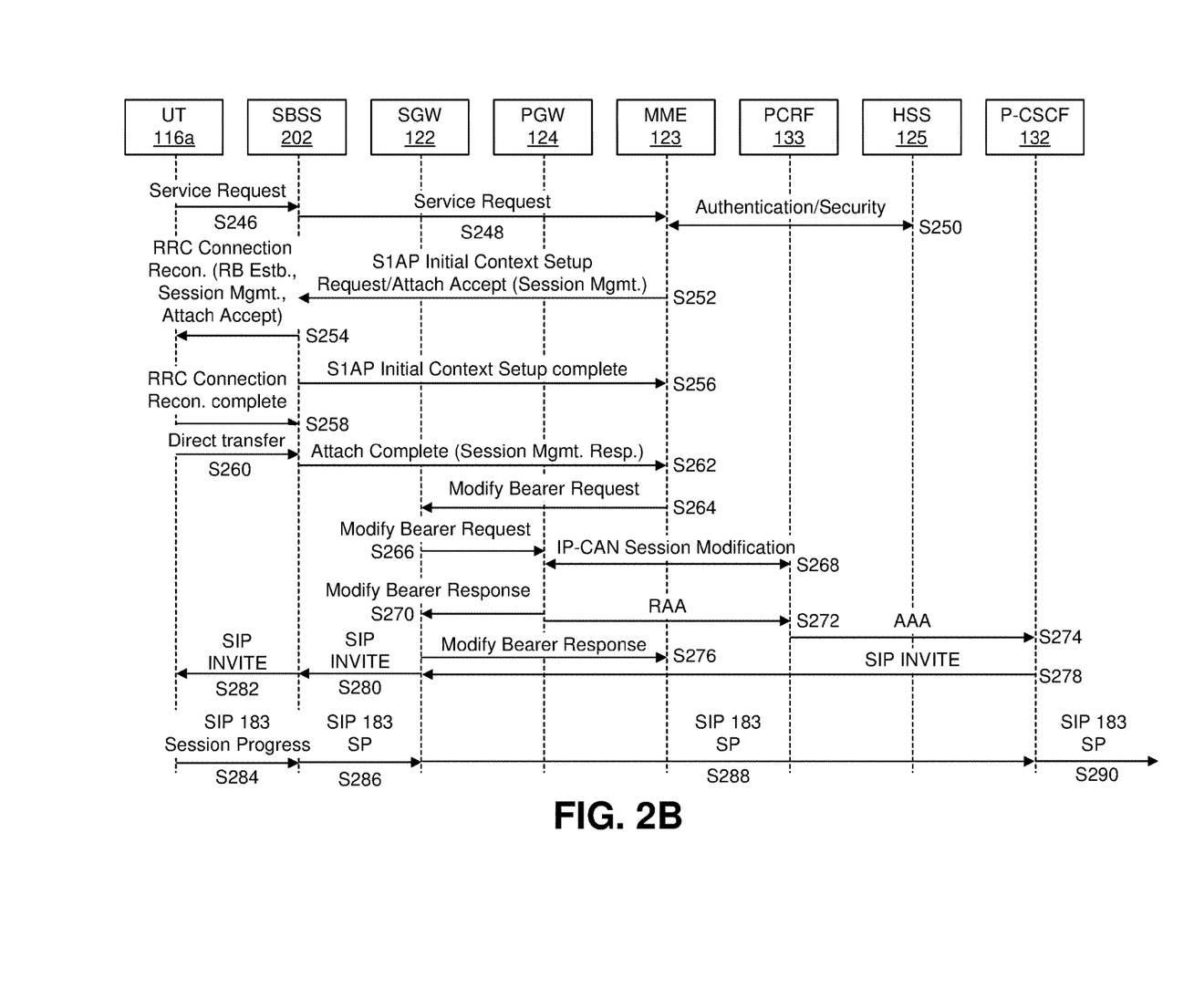

FIGS. 2A and 2B illustrate an example of the MSS-LTE network 100 shown in FIG. 1 operating to perform alerting when the UT 116a is in the ECM-Idle state. The SBSS 202 illustrated in FIGS. 2A and 2B refers to the SBSS described in FIG. 1.

A SIP INVITE message including an SDP message is received by the P-CSCF 132 with a destination of UT 116a for a new multimedia session (S206), In response to receiving the SIP INVITE, the P-CSCF 132 indicates that the SIP INVITE has been received by responding with a SIP 100 TRYING message (S208). The P-CSCF 132 holds the SIP INVITE until the P-CSCF 132 receives a notification from the PCRF 133 that the SIP INVITE can be sent (as shown for operation S278 in FIG. 2B). Also in response to receiving the SIP INVITE, the P-CSCF 132 makes, based on at least one or more fields included in the SDP message, an initial determination whether alerting is suitable for the new multimedia session (which may include a determination as to how the alerting is to be performed). In some examples, the initial determination is based on at least a multimedia session type for the new multimedia session being included in a selected set of one or more multimedia session types. For example, alerting may be determined to be suitable if the SDP message indicates a voice call with a vocoder type such as DVSI, AMR-NB, AMR-WB, or other codecs. The P-CSCF 132 establishes an Rx Session with the PCRF 133 with an Authorize/Authenticate-Request (AAR) message indicating the initial determination in a Reservation-Priority AVP, MPS-Identifier AVP, and/or other Rx protocol AVP (S210). Although FIG. 2A illustrates use of Reservation-Priority AVP and/or MPS-Identifier AVP for the purpose of discussion, it is understood that other Rx protocol AVPs may be similarly applied. In some implementations, the PCRF 133 is included in the P-CSCF 132. In some circumstances, the PCRF 133 communicates with SPR 135 via an Sp Diameter interface to make a profile request for the user of the UT 116a (S212). The SPR 135 sends a profile response back to the PCRF 133 with user profile data via the Sp interface (S214).

Based on the initial determination indicated by the P-CSCF 132 in the AAR message, the PCRF 133 determines whether alerting is suitable for the new multimedia session, and, if it determines that alerting is suitable (which may include a determination as to how the alerting is to be performed), also a corresponding QCI value (qciX), ARP value (arpX), and/or other QoS parameter value. Although FIG. 2A illustrates use of QCI and/or ARP values for the purpose of discussion, it is understood that other QoS parameters may be similarly applied. In some implementations, only a single QCI, ARP, or other QoS parameter value is used to identify multimedia sessions suitable for alerting. In some examples, the determination of whether alerting is suitable may further be based on a subscription type indicated by user profile data retrieved from the SPR 135; for example, alerting (or at least nonemergency alerting) may be limited to certain user subscription types, such as "gold" subscriptions. In some examples, the determination of whether alerting is suitable may further be based on whether the new multimedia session is for an emergency. For example, a call may be determined to be suitable for alerting based on the call coming from a Public Safety Answering Point (PSAP). In some examples, the determination of whether alerting is suitable may further be based on whether the multimedia session is coming from a user-specified source. For example, a user might identify particular phone numbers for which alerting is desired. The determination of whether alerting is suitable may further be based on a current time of day and/or a current day of the week complying with time-based criteria (which may be user configurable). For example, alerting may only be performed for a UT during ordinary business hours.

In some implementations, there are multiple different QCI, ARP, and/or other QoS parameter values, and corresponding multiple different Reservation-Priority AVP, MPS-Identifier AVP, and/or other Rx protocol AVP values, that each indicate that alerting is suitable and provide information indicating how the alerting is to be performed. In some examples, a QCI, ARP, and/or other QoS parameter value identifies a multimedia session as suitable for an emergency alerting procedure (which may result in SBSS 202 proceeding immediately to alerting without first attempting ordinary paging). In some examples, a plurality of QCI, ARP, and/or other QoS parameter values correspond to a plurality of alerting amplitude level increases (for example, a "low" value results in +5 dB, a "medium" value results in +10 dB, and a "high" value results in +15 dB). In some examples, one of the plurality of alerting amplitude level increases is selected based on at least a terminal capability recorded for the UT 116a. A smaller increase may be effective for a UT with a larger high gain antenna, allowing conservation of satellite resources while alerting. In contrast, a handheld UT may not receive an alert with only the smaller increase, but may receive the alert by applying a greater increase. In some examples, the determination of whether alerting is suitable may further be based on previous uses of alerting for paging a UT; for example, if paging of the UT frequently requires alerting for the UT to receive paging, a QCI, ARP, and/or other QoS parameter value may be used to indicate that alerting is suitable and that a reduced number or no ordinary paging attempts are to be performed before using alerting. The reduced number of ordinary paging attempts conserves radio resources and reduces delays in establishing communication. It is noted that the various determinations described above of whether alerting is suitable and/or how the alerting is to be performed each may be implemented by P-CSCF 132 and/or PCRF 133.

In some implementations, a QCI value used to indicate that alerting is suitable is included in the 3GPP standardized QCI values. As of 3GPP TS 23.203 Release 15.1.0, the QCI values of 1-9, 65-67, 69, 70, 75, 79, and 80 are standardized. For example, a QCI value of 1 (having a high standardized priority level and corresponding to conversational voice) may be used to identify a multimedia session as suitable for alerting. In some implementations, a QCI value used to indicate that alerting is suitable is outside of the 3GPP standardized QCI values. For example, QCI values in the range 40-49 may be used by PCRF 133 to identify a multimedia session as suitable for alerting, and MME 123 configured to recognize those QCI values for that purpose. Similar usage of standardized and/or unstandardized values may be performed with other QoS parameters.

The PCRF 133 delivers a created Policy and Charging Control (PCC) rule, including the determined QCI value (qciX), ARP value (arpX), and/or other QoS parameter of the PCC rule, in a Re-Authorization Request (RAR) transmitted to the PGW 124 (such as to a Policy and Charging Rules Function (PCEF) included in the PGW 124) via a Gx Diameter interface (S216). Based on the PCC rule authorized by PCRF 133 and pushed to the PGW 124, the PGW 124 sends a Create (dedicated) Bearer Request, including the QCI value (qciX), the ARP value (arpX), and/or other QoS parameter value, to the SGW 122 (S218), and the SGW 122 sends the Create (dedicated) Bearer Request to the MME 123 (S220).

In response to receiving the Create (dedicated) Bearer Request from the SGW 122, the MME 123 determines that the UT 116a is in the ECM-Idle state (S222). In response to the determination that the UT 116a is in the ECM-Idle state, the MME 123 initiates paging by sending an S1AP Paging message to the SBSS 202 to wake up the UT 116a (S224). The Paging message includes a Paging Priority IE, a value of which (levelY) is determined by the MME 123 based on the QCI value (qciX), ARP value (arpX), and/or other QoS parameter value being used to indicate suitability of alerting included in the Create (dedicated) Bearer Request received by the MME 123. In some implementations, a QCI value of 1 is used to indicate to the MME 123 that alerting is suitable, and the value of the Paging Priority IE set to PrioLevel1 (the highest paging priority, which conventionally is reserved for voice call only) in response to the received QCI value of 1 and to indicate to the SBSS 202 that alerting is suitable. The Paging Priority IE may be omitted (as it is optional) or have a predetermined value to indicate when alerting is not suitable. Much as discussed above with respect to the QCI value, ARP value, and/or other QoS parameter in the PCC rule, in some implementations, there are multiple different Paging Priority IE values that each indicate that alerting is suitable and provide information indicating how the alerting is to be performed. If the values provided to the MME 123 and the Paging Priority IE values provided to the SBSS 202 are not identical, a one to one mapping of QCI, ARP, and/or other QoS parameter values to Paging Priority IE values may be used to convert values received by the MME 123 to their respective Paging Priority IE values provided to the SBSS 202.

In some implementations, in response to receiving the S1AP Paging message from the MME 123, the SBSS 202 transmits an RRC Paging message in an area, such as via a spot beam, where the UT 116a might be located (S226). In some circumstances, where a QCI, ARP, and/or other QoS parameter value and the respective Paging Priority IE value received by the SBSS 202 indicate that ordinary paging is not to be performed, operations S226-S234 are not performed, and instead the SBSS 202 proceeds directly to alerting (S236). In this example, the SBSS 202 does not receive a response to the RRC Paging message within a predetermined time, causing a timer T227 (which is started in operation S226) to expire (which may be referred to as a "paging timeout"). In response to the expiration of the timer T227, the SBSS 202 determines there was no response to the RRC Paging message (S228). The RRC Paging message may be repeated a predetermined number of times, as described for operations S226 and S228). In some circumstances, where a QCI, ARP, and/or other QoS parameter value received by the MME 123 and the respective Paging Priority IE value received by the SBSS 202 indicate that retries are not to be performed, the SBSS 202 skips retries of the RRC Paging message, and instead the SBSS 202 proceeds directly to alerting (S236). In some circumstances, where a QCI, ARP, and/or other QoS parameter value and the respective Paging Priority IE value received by the SBSS 202 indicate that the maximum number of retries is reduced, the SBSS 202 reduces the maximum number of retries of the RRC Paging message, after which the SBSS 202 may proceed to alerting (S236).

FIG. 2A illustrates that in response to an expiration of a timer T225 (which is started in operation S224) for the MME 123, the MME 123 may send an additional S1AP Paging message for the multimedia session (S230). The SBSS 202 ignores any such additional S1AP Paging messages. In some implementations, after one or more attempts of the RRC Paging operation at S226 without response from the UT 116a, the SBSS 202 performs an escalated paging procedure (S232) in which a paging area is expanded (for example, to multiple spot beams) for transmitting an ordinary paging signal. Much as described for the paging at operation S236, the SBSS 202 may determine that the UT 116a has not responded (S234) in response to an expiration of a timer T233 (which is started in operation S232). A Paging Priority IE value received by the SBSS 202 may cause escalated paging to be performed, not performed, performed without retries, or performed with a reduced number of retries.

If the above ordinary paging signals do not result in a response for the UT 116a, or if the SBSS 202 determines it will not perform ordinary paging for the multimedia session, the SBSS 202 transmits a high penetration alerting signal to an area, such as via a spot beam, where the UT 116a might be located (S236). Much as with the ordinary paging signal, the SBSS 202 may determine that the UT 116a has not responded to the high penetration message alerting signal in response to expiration of a timer T237 (which is started in operation S236), and may be configured to perform retries of the high penetration message alerting signal. Similarly as described for the ordinary paging signals, a Paging Priority IE value received by the SBSS 202 may cause fewer or no retries of the alerting. Additionally, a Paging Priority IE value received by the SBSS 202 may indicate and affect an amount of amplitude increase, as discussed in connection with the first alerting technique described in FIG. 1. Also, a Paging Priority IE value received by the SBSS 202 may indicate and affect a level of change in waveform or coding scheme, as discussed in connection with the second alerting technique described in FIG. 1. In some implementations, after one or more attempts of the high penetration alerting operation at S236 without response from the UT 116a, the SBSS 202 performs an escalated alerting procedure (S240) in which a paging area is expanded (for example, to multiple spot beams) for transmitting a high penetration alerting signal for the multimedia session.

In response to receiving a high penetration alerting signal (whether transmitted in operation S236 or S238), the UT 116a notifies the user to move to a better reception area for the multimedia session (S242). For example, the UT 116a may emit a special tone or sound and/or display a message, thereby prompting a user of the UT 116a to move to an area with better reception to engage in the multimedia session. Once the user has moved, the user may respond to the UT 116a (S244). The UT 116a responds to the user response by sending a Service Request to the SBSS 202 (S246), which is forwarded to the MME 123 (S248). The MME 123 then starts the authorization process of the UT 116a with the HSS 125 (S250) and sets up the context and the bearer for the UT 116a (S252, S254, S256, S258, S260, S262, S264, S266, and S268). Once the bearer has been set up, the PGW 124 notifies the PCRF 133 (S272), which in turn notifies the P-CSCF 132 with an Authentication Authorization Answer (AAA) message (S274). Once the P-CSCF 132 receives the AAA message, the P-CSCF 132 forwards the SIP INVITE to the UT 116a via the PGW 124 and the SBSS 202 (S278, S280, and S282). The SIP signaling will then continue (S284, S286, S288, and S290) until the incoming multimedia session is established or rejected.

Figure 3:
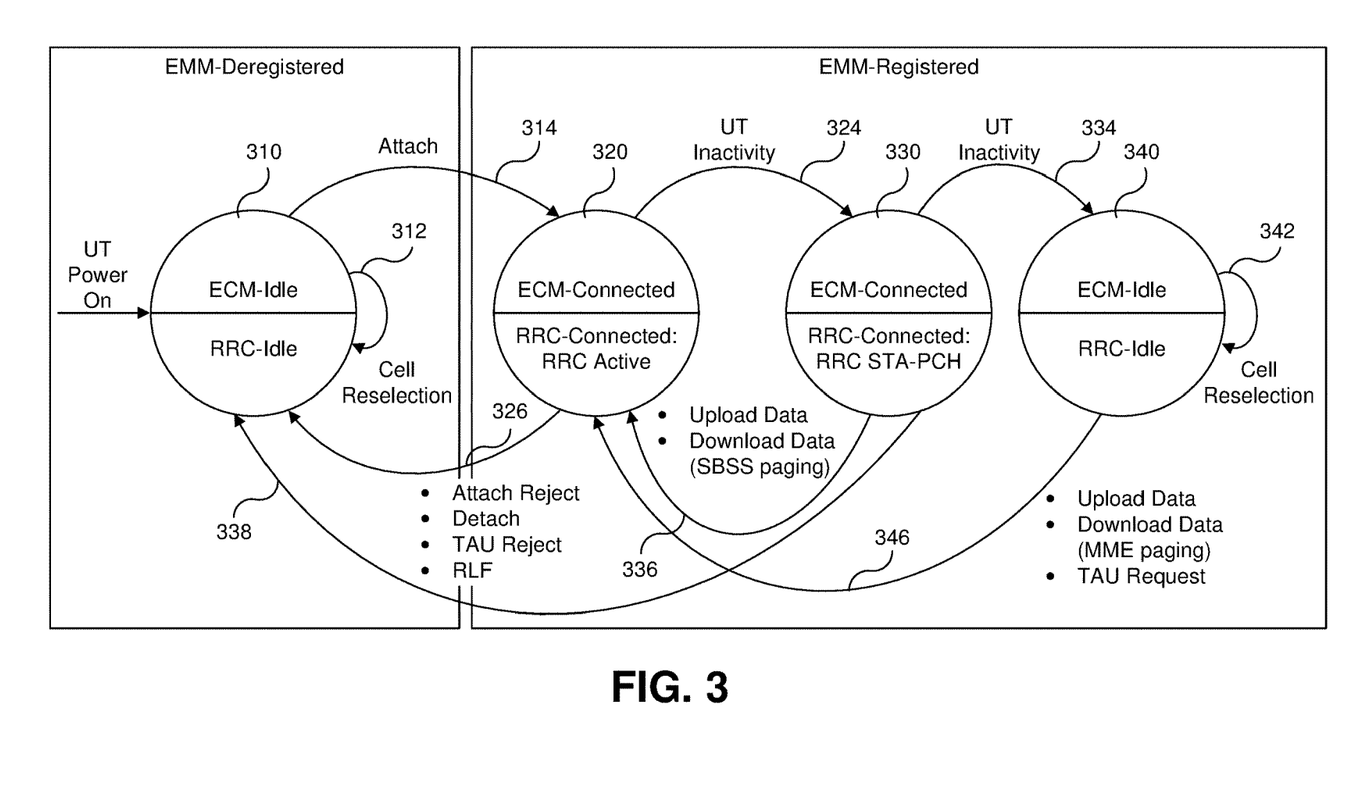
FIG. 3 illustrates a state machine, for UTs operating on the MSS-LTE network illustrated in FIG. 1, that includes a new RRC Satellite Tracking Area-PCH (RRC STA-PCH) state.

FIG. 3 illustrates a state machine, for UTs operating on the MSS-LTE network 100 illustrated in FIG. 1, that includes use of a new RRC Satellite Tracking Area-PCH (RRC STA-PCH) state. Each of a first state 310, a second state 320, a third state 330, and a fourth state 340 is a combination of three EMM (EPS Mobility Management) related states: EMM state (which is either EMM-Deregistered or EMM-Registered in FIG. 3), ECM state (which is either ECM-Idle or ECM-Connected in FIG. 3), and RRC state (which is one of RRC-Idle, RRC-Connected: RRC Active, or RRC-Connected: RRC STA-PCH in FIG. 3). In the EMM-Deregistered state, no EMM context has been established and the UT location is unknown to the MME 123 and hence it is unreachable by the MME 123. In the EMM-Registered state, an EMM context has been established and a default EPS bearer context has been activated in the UT. In the ECM-Idle state (which is referred to as EMM-Idle in 3GPP 24.301), there is no NAS signaling connection between a UT and the MSS-LTE network 100 exists or a RRC connection suspend has been indicated. In the ECM-Connected state (which is referred to as EMM-Connected in 3GPP 24.301), a NAS signaling connection between UT and the MSS-LTE network 100 is established. In the RRC-Idle state, an RRC connection is not currently established between a UT and the SBSS 202 (which may be a result of a release or suspend of an RRC connection). In the RRC-Connected: RRC STA-PCH state, as with the RRC-Idle state, an active RRC connection is not currently established between a UT and the SBSS 202. In the RRC-Connected: RRC Active state, a UT has an established RRC connection with the SBSS 202.

In the first state 310, a UT is in the EMM-Deregistered state, the ECM-Idle state, and the RRC-Idle state. Via an Attach procedure, the UT transitions (314) to the second state 320. In the second state 320, the UT is in the EMM-Registered state, the ECM-Connected state, and the RRC-Connected state. After a period of inactivity, the UT transitions (324) to the third state 330. In the third state 330, the UT remains in the EMM-Registered state and the ECM-Connected state, but is also in the RRC STA-PCH state. After another period of inactivity, the UT transitions (334) to the fourth state 340. In the fourth state 340, the UT remains in the EMM-Registered state, but is also in the ECM-Idle state and the RRC-Idle state. FIG. 3 also illustrates a transition 346 from the fourth state 340 to the second state 320, which occurs as a result of the operations illustrated in FIGS. 2A and 2B. FIG. 3 further illustrates a transition 336 from the third state 330 to the second state 320, which occurs as a result of the operations illustrated below in FIGS. 4A and 4B. FIG. 3 also illustrates a transition 326 from the second state 320 to the first state 310, a transition 338 (triggered by the same events as the transition 326) from the third state 330 to the first state 310, and cell reselection events 312 and 342.

The new RRC STA-PCH state is introduced for UTs in ECM-Connected state/RRC-Connected state. When a UT is in the RRC STA-PCH state, from the perspective of the MME 123, the UT is in ECM-Connected state in which the MME 123 does not need to page the UT when there is downlink data for the UT. As a result, and as illustrated by the example in FIGS. 4A and 4B described below, there is no need for the UT to engage in a Service Request process that can take up resources and can delay the transmission of the downlink data. From the perspective of the SBSS 202, the UT location is known (or at least a likely location for the UT), but no physical resource is allocated to the UT. The UT does not need to perform an update to inform the SBSS 202 of its location since the SBSS 202 knows the UT location (or at least a likely location for the UT). In this case, the SBSS 202 will page the UT to transition the UT state to the second states 320 before sending any message to the UT. To accommodate the RRC STA-PCH state, the UT idle timer at the Core Network needs to be set longer than the UT RRC idle state timer at the SBSS 202. Adding the RRC STA-PCH state offers at least two significant advantages. First, the UT remains in the ECM-Connected state, so there is no lengthy MME initiated paging process to deliver downlink data to the UT, which conserves bandwidth and power for the satellite 110, and also improves the speed with which the UT returns to the second state 320. Second, the UT does not need to do cell-update and the UT is not allocated air link resources in the RRC STA-PCH state, and as a result there will be savings in over the air resource usage.

Figure 4A:
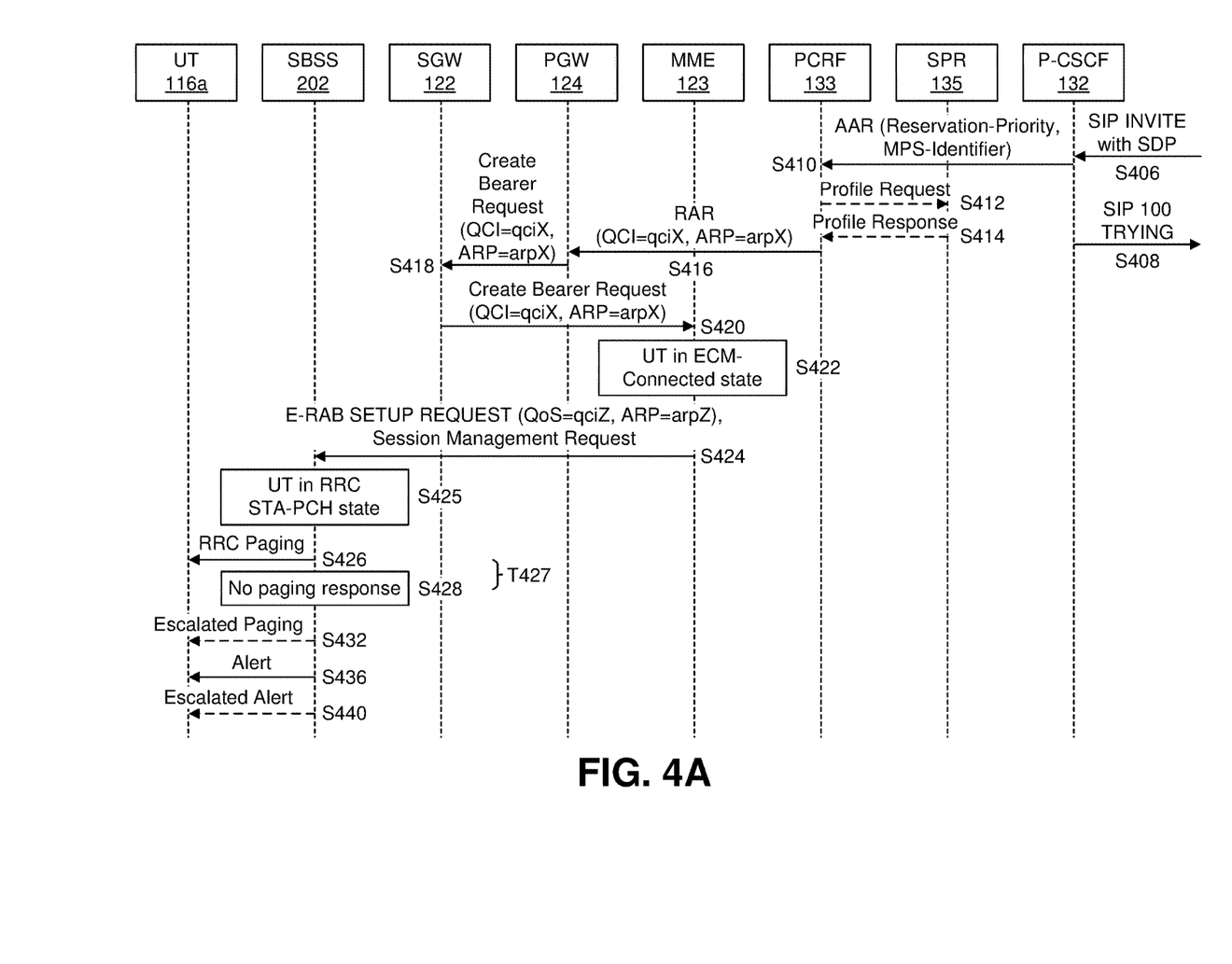
FIGS. 4A and 4B illustrate an example of operations performed by components of the MSS-LTE network shown in FIG. 1 in connection with alerting performed when a UT is in the RRC STA-PCH state.
Figure 4B:
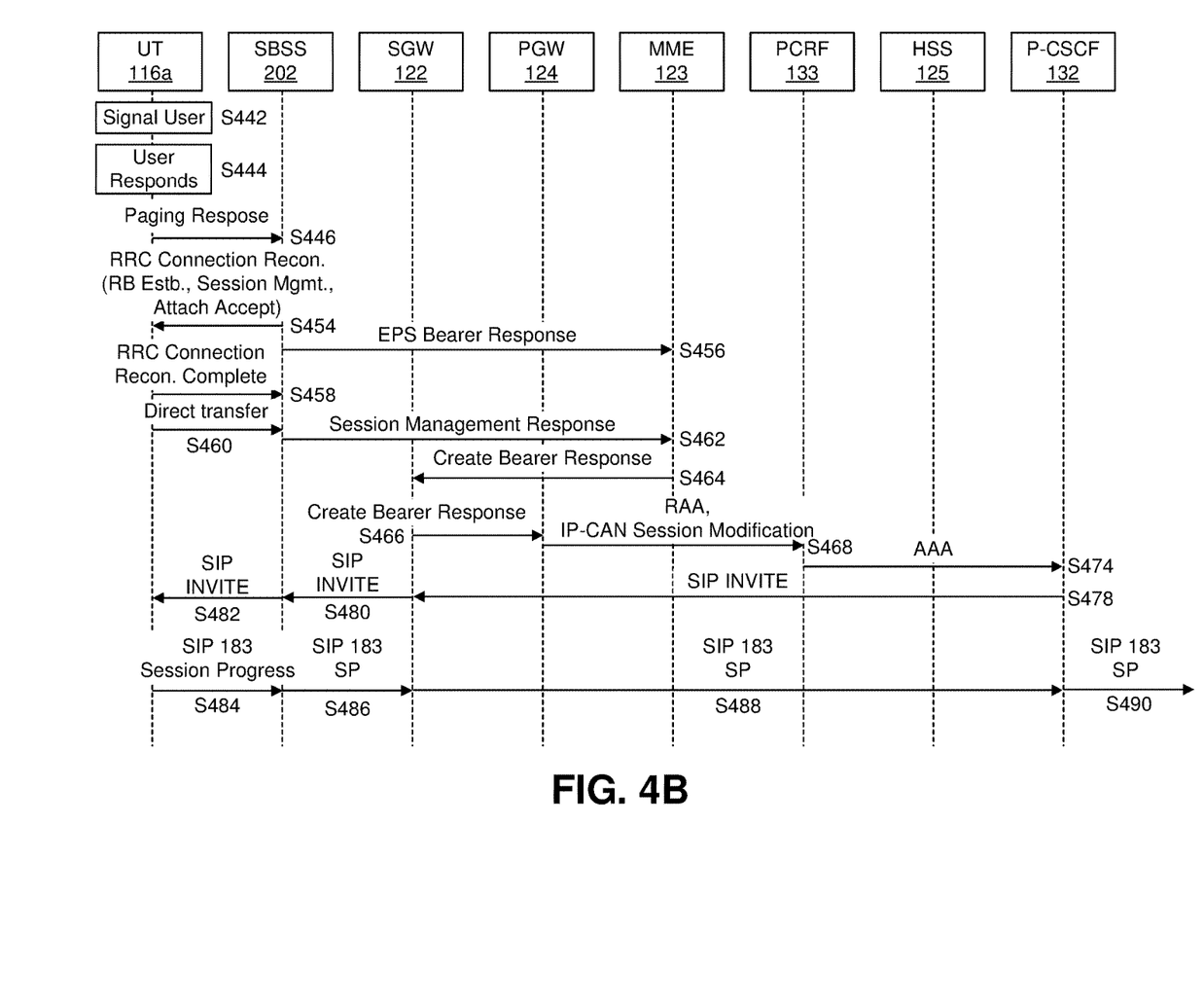

FIGS. 4A and 4B illustrate an example of operations performed by components of the MSS-LTE network 100 shown in FIG. 1 in connection with alerting performed when the UT 116a is in the RRC STA-PCH state. In this state, from the perspective of the MME 123, the UT is in the ECM-Connected state. Hence, when a dedicated bearer needs to be set up, the MME 123 will send the E-RAB SETUP REQUEST containing E-RAB Level QoS Parameters and Session Management Request to the SBSS 202. The Session Management Request contains, among other things, EPS quality of service values (QCI, ABR, and GBR).

The operations S406, S408, S410, S412, S414, S416, S418, and S420, which result in the MME 123 receiving a Create (dedicated) Bearer Request including a QCI, ARP, and/or other QoS parameter value indicating whether alerting is suitable for the SIP INVITE received in operation S406 and/or providing information indicating how such alerting is to be performed, are the same as their respective operations S206, S208, S210, S212, S214, S216, S218, and S220. Thus, they are not discussed in detail for FIGS. 4A and 4B.

In response to receiving the Create (dedicated) Bearer Request from the SGW 122, the MME 123 determines that the UT 116a is in the RRC STA-PCH state (S422). In response to the determination that the UT 116a is in the RRC STA-PCH state, the MME 123 sends an E-RAB SETUP REQUEST to the SBSS 202. The E-RAB SETUP REQUEST includes E-RAB Level QoS Parameters including a QCI value (qciZ), ARP value (arpZ), and/or other QoS parameter value, a value of which is determined by the MME 123 based on the QCI value (qciX), ARP value (arpX), and/or other QoS parameter value included in the Create (dedicated) Bearer Request received by the MME 123. In some implementations, a qciX value of 1 indicates alerting is suitable, and the value of qciZ is also set to 1 in response to the received qciX value of 1. In some implementations, the QCI value (qciZ), ARP value (arpZ), and/or other QoS parameter value in the E-RAB SETUP REQUEST is simply the same as the respective QCI value (qciX), ARP value (arpX), and/or other QoS parameter value included in the Create (dedicated) Bearer Request. Much as discussed above with the QCI, ARP, and/or other QoS parameter value in the PCC rule, in some implementations, there are multiple different values used for the Create (dedicated) Bearer Request that each indicate that alerting is suitable and provide information indicating how the alerting is to be performed. If the values used for the Create (dedicated) Bearer Request and the values used for the E-RAB SETUP REQUEST are not identical, a mapping of the values used for the Create (dedicated) Bearer Request to the values used for the E-RAB SETUP REQUEST values may be used to generate the E-RAB Level QoS Parameters sent to the SBSS 202.

In some implementations, in response to receiving the E-RAB SETUP REQUEST from the MME 123, the SBSS 202 transmits an RRC Paging message in an area, such as via a spot beam, where the UT 116a might be located (S426). In some circumstances, where a QCI, ARP, or other QoS parameter value received by the SBSS 202 indicates that ordinary paging signaling is not to be performed for a session, operation S432 is not performed, and instead the SBSS 202 proceeds directly to alerting (S436). In the example illustrated in FIGS. 4A and 4B, the SBSS 202 does not receive a response to the RRC Paging message within a predetermined time, causing a timer T427 (which is started in operation S426) to expire. In response to the expiration of the timer T427, the SBSS 202 determines there was no response to the RRC Paging message (S228). SBSS 202 may be configured to transmit one or more retries of the RRC Paging message from S426, perform escalated paging (S432), transmit high penetration alerts (S436), and or transmit escalated high penetration alerts (S440), in response to QCI, ARP, and/or other QoS parameter values provided by the PCRF 133, much as described for operations S226, S228, S232, S234, S236, S238, and S240 in FIG. 2A. Also, a QCI, ARP, and/or other QoS parameter value provided in the E-RAB SETUP REQUEST may affect how paging (S426), escalated paging (S432), alerting (S436), and/or escalated alerting (S440) are performed, much as previously described in connection with operations S226, S228, S232, S234, S236, S238, and S240 in FIG. 2A.

In response to receiving a high penetration alerting signal (whether transmitted in operation S436 or S438), the UT 116a notifies the user to move to a better reception area for the multimedia session (S442), as described for operation S242 in FIG. 2A. Once the user has moved, the user may respond to the UT 116a (S444). The UT 116a responds to the user response by sending a Paging Response to the SBSS 202 (S446). In response to receiving the Paging Response from the UT 116a, the SBSS 202 maps the E-RAB Level QoS Parameters to a Radio Bearer (RB) QoS. The SBSS 202 then transmits a RRC Connection Reconfiguration message, containing the Radio Bearer QoS, Session Management Request, EPS RB Identity and Attach Accept, to the UT 116a (S454). The SBSS 202 also transmits an E-RAB SETUP RESPONSE to the MME 123 (S456).

The UT 116a transmits a Direct Transfer message containing a Session Management Response to the MME 123 via the SBSS 202 (S460 and S462). The MME 123 then transmits a Create Bearer Response to the PGW 124 via the SGW 122 (S464 and S466). In response to receiving the Create Bearer Response, the PGW 124 notifies the PCRF 133 with an RAA message (S468). In response to receiving the RAA message, the PCRF 133 transmits an AAA message to the P-CSCF 132 (S474), as a response for the AAR message received from the P-CSCF 132 in operation S410. Once the P-CSCF 132 receives the AAA message, the P-CSCF 132 forwards the SIP INVITE to the UT 116a via the PGW 124 and the SBSS 202 (S478, S480, and S482). The SIP signaling will then continue (S484, S486, S488, and S490) until the incoming multimedia session is established or rejected.

The example in FIGS. 4A and 4B illustrates a benefit of the new third state 330 in FIG. 3. By not transitioning directly from the second state 320 (ECM-Connected and RRC-Connected: RCC Active) to the fourth state 340 (ECM-Idle and RRC-Idle) in response to inactivity, but instead first transitioning to the new third state 330 (ECM-Connected and RRC-Connected: RCC STA-PCH), the UT 116a remains in the ECM-Connected state. As a result, the MME 123 does not need to page the UT, and there is no need for the UT to engage in a Service Request process that can take up resources and add delay (which is particularly beneficial for setting up real-time sessions).

It is noted that various conversions or mappings of alerting-related values between messages described in FIGS. 2A and 4A, such as between the AAR message received by PCRF 133 and the RAR message received by PGW 124, may be defined and configured by an operator of the satellite network 102.

In summary, described are procedures for providing the SBSS 202 with selective and efficient high penetrating alerting for incoming multimedia sessions to UTs. The SBSS 202 can selectively perform alerting for incoming multimedia sessions if it is informed by the MSS-LTE CN appropriately. For example, the SBSS 202 can inspect the Paging Priority IE of an S1AP Paging message transmitted by the MME 123 when a UT is in the ECM-Idle state. Inspection of the Paging Priority IE and the corresponding actions performed by the SBSS 202 depends on the MME 123 appropriately setting the Paging Priority IE according to the operator policy appropriately, i.e. can configure the user profile in the HSS 125. In another condition, in which the UT is in the RCC STA-PCH state, the SBSS 202 inspects the E-RAB Level QoS Parameters to determine if alerting is suitable for the incoming multimedia session. The SBSS 202 may first transmit a configurable number of ordinary paging signals, and after no response is received from the UT, the SBSS 202 transmits a high penetrating alert signal to the UT. Inspection of the E-RAB Level QoS Parameters and the corresponding actions performed by the SBSS 202 depends on the MME 123 appropriately setting the E-RAB Level QoS Parameters according to the operator policy appropriately, i.e. can configure the user profile in the HSS and authorized by the PCRF 133.

Figure 5:
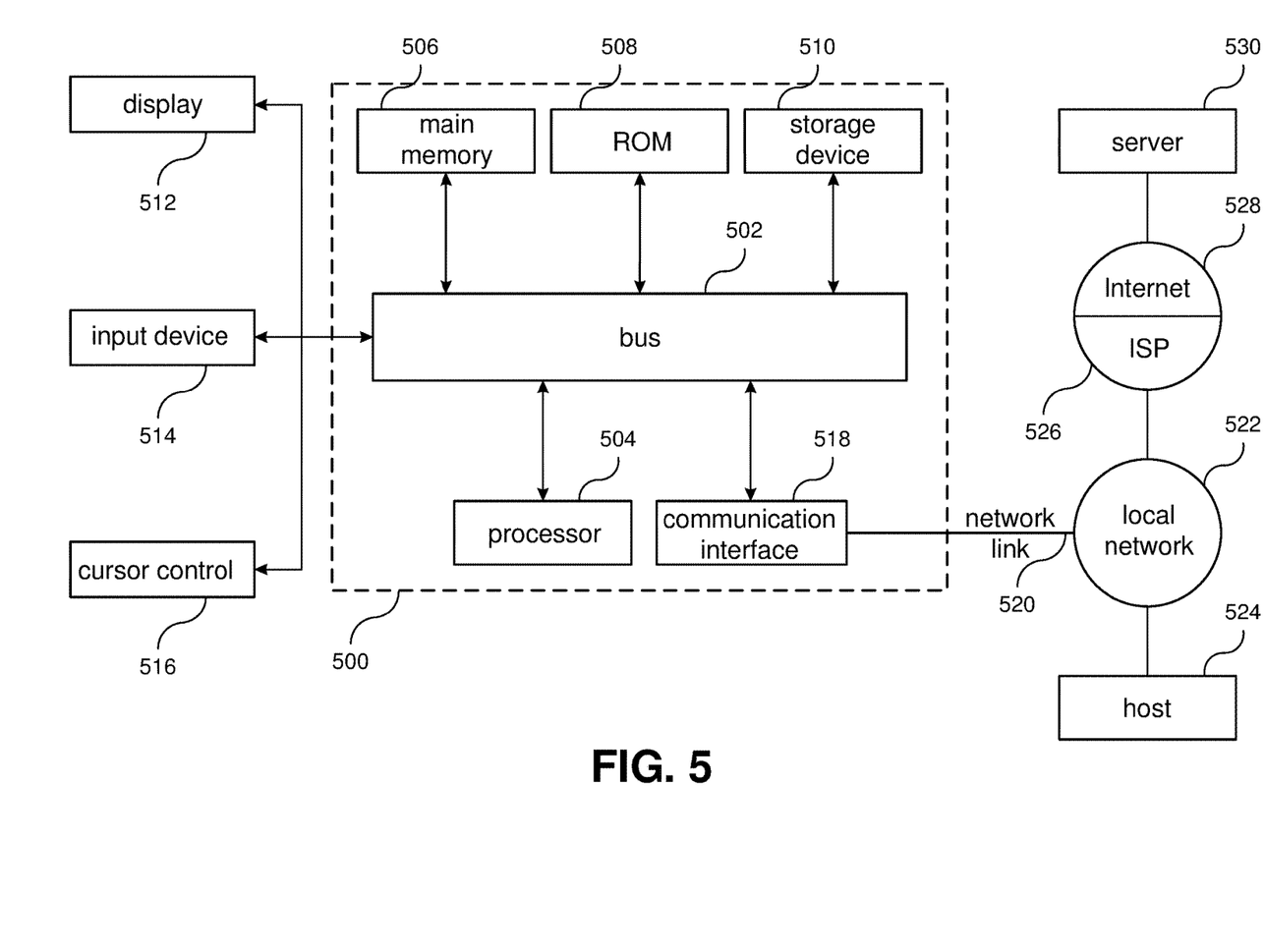
FIG. 5 is a block diagram showing an example computer system 500 upon which aspects of this disclosure may be implemented.

FIG. 5 is a block diagram showing an example computer system 500 upon which aspects of this disclosure may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. The computer system 500 can implement, for example, one or more of, or portions of system 100, system 200, object detection service 250, object detection module repository 260, and/or head-mounted device 300.

Computer system 500 can further include a read only memory (ROM) 508 or other static storage device coupled to bus 502 for storing static information and instructions for processor 504. A storage device 510, such as a flash or other non-volatile memory can be coupled to bus 502 for storing information and instructions.

Computer system 500 may be coupled via bus 502 to a display 512, such as a liquid crystal display (LCD), for displaying information. One or more user input devices, such as the example user input device 514 can be coupled to bus 502, and can be configured for receiving various user inputs, such as user command selections and communicating these to processor 504, or to a main memory 506. The user input device 514 can include physical structure, or virtual implementation, or both, providing user input modes or options, for controlling, for example, a cursor, visible to a user through display 512 or through other techniques, and such modes or operations can include, for example virtual mouse, trackball, or cursor direction keys.

The computer system 500 can include respective resources of processor 504 executing, in an overlapping or interleaved manner, respective program instructions. Instructions may be read into main memory 506 from another machine-readable medium, such as storage device 510. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media can include, for example, optical or magnetic disks, such as storage device 510. Transmission media can include optical paths, or electrical or acoustic signal propagation paths, and can include acoustic or light waves, such as those generated during radio-wave and infra-red data communications, that are capable of carrying instructions detectable by a physical mechanism for input to a machine.

Computer system 500 can also include a communication interface 518 coupled to bus 502, for two-way data communication coupling to a network link 520 connected to a local network 522. Network link 520 can provide data communication through one or more networks to other data devices. For example, network link 520 may provide a connection through local network 522 to a host computer 524 or to data equipment operated by an Internet Service Provider (ISP) 526 to access through the Internet 528 a server 530, for example, to obtain code for an application program.

Other implementations are contemplated. For example, while the description and illustrations covered above refer to 3GPP 4G/LTE specifications and procedures, this concept of Alerting and QoS Establishment can also be applied to non-3GPP systems and satellite systems that are in GEO, MEO, or LEO orbits.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A method of operating a Long-Term Evolution (LTE) mobile satellite system (MSS-LTE) communication network, the method comprising:
    determining that a first user terminal (UT) is in a first state;
    determining, as a result of an attach procedure for the first UT to the MSS-LTE while the first UT is in the first state, that the first UT is in a second state in which the first UT has established a Non-Access Stratum protocol (NAS) signaling connection with the MSS-LTE network and an active Radio Resource Control protocol (RRC) connection with the MSS-LTE network;
    determining, as a result of the first UT being inactive while the first UT is in the second state, that the first UT is in a third state in which the first UT maintains the NAS signaling connection and releases or suspends the RRC connection;
    receiving a first request to establish a first multimedia session with the first UT;
    transmitting, in response to receiving the first request and the first UT being in the third state, an Evolved Universal Mobile Telecommunications System (UMTS) Terrestrial Radio Access Network (E-UTRAN) Radio Access Bearer (E-RAB) SETUP REQUEST including a first quality of service (QoS) parameter value indicating the first multimedia session is suitable for a high penetration alerting procedure;
    receiving the E-RAB SETUP REQUEST; and
    in response to receiving the E-RAB SETUP REQUEST, and based at least on the first QoS parameter value included in the received E-RAB SETUP REQUEST, transmitting a high penetration alert signal to the first UT.

2. The method of claim 1, further comprising:
in response to receiving the E-RAB SETUP REQUEST and before transmitting the high penetration alert signal, transmitting an ordinary paging signal to the first UT.

3. The method of claim 1, wherein the first QoS parameter value is QoS class indicator value or an Allocation and Retention Policy (ARP) value.

4. The method of claim 1, further comprising:
determining that a second UT is in the second state;
determining, as a result of the second UT being inactive while the second UT is in the second state, that the second UT is in the third state;
determining, as a result of the second UT being inactive while the second UT is in the third state, that the second UT is in a fourth state;
receiving a first request to establish a second multimedia session with the second UT;
transmitting, in response to receiving the first request and the second UT being in the fourth state, a S1AP Paging request including a Paging Priority value indicating the second multimedia session is suitable for a high penetration alerting procedure;
receiving the S1AP Paging request; and
in response to receiving the S1AP Paging request, and based on at least the Paging Priority value included in the received S1AP Paging request, transmitting a high penetration alert signal to the second UT.

5. The method of claim 1, further comprising:
generating, by a PCRF, a Policy and Charging Control (PCC) rule including a QoS parameter value indicating the first multimedia session is suitable for the high penetration alerting procedure,
wherein the transmitting a high penetration alert signal to the first UT is further in response to the PCC rule indicating that the first multimedia session is suitable for the high penetration alerting procedure.

6. The method of claim 1, further comprising:
retrieving, in response to receiving the first request, user profile data for a user of the first UT; and
determining that the first multimedia session is suitable for the high penetration alerting procedure based at least on the retrieved user profile data.

7. The method of claim 1, further comprising:
selecting one of a plurality of degrees or levels of increased amplitude for the high penetration alert signal relative to an ordinary paging signal;
including a second QoS parameter value in the transmitted E-RAB SETUP REQUEST, the second QoS parameter value indicating the selected degree or level; and
adjusting an amplitude of the transmitted high penetration alert signal based at least on the second QoS parameter value included in the received E-RAB SETUP REQUEST.

8. The method of claim 1, further comprising:
determining, based at least on the first request, that the first multimedia session is for an emergency,
wherein the first QoS parameter value included in the transmitted E-RAB SETUP REQUEST is selected in response to the determination that the first multimedia session is for an emergency.

9. The method of claim 1, further comprising:
determining that the first UT has frequently required use of high penetration alerting for the first UT to receive paging; and
reducing, based on the determination that the first UT has frequently required use of high penetration alerting for the first UT to receive paging, a number of transmissions of ordinary paging signals transmitted to the first UT in response to receiving the E-RAB SETUP REQUEST prior to the transmission of the high penetration alert signal.

10. A Long-Term Evolution (LTE) mobile satellite system (MSS-LTE) communication network comprising:
a plurality of processors; and
a plurality of non-transitory machine-readable media including instructions which, when executed by the processors, cause the processors to:
determine that a first user terminal (UT) is in a first state;
determine, as a result of an attach procedure for the first UT to the MSS-LTE while the first UT is in the first state, that the first UT is in a second state in which the first UT has established a Non-Access Stratum protocol (NAS) signaling connection with the MSS-LTE network and an active Radio Resource Control protocol (RRC) connection with the MSS-LTE network;
determine, as a result of the first UT being inactive while the first UT is in the second state, that the first UT is in a third state in which the first UT maintains the NAS signaling connection and releases or suspends the RRC connection;
receive a first request to establish a first multimedia session with the first UT;
transmit, in response to receiving the first request and the first UT being in the third state, an Evolved Universal Mobile Telecommunications System (UMTS) Terrestrial Radio Access Network (E-UTRAN) Radio Access Bearer (E-RAB) SETUP REQUEST including a first quality of service (QoS) parameter value indicating the first multimedia session is suitable for a high penetration alerting procedure;
receive the E-RAB SETUP REQUEST; and
in response to receiving the E-RAB SETUP REQUEST, and based at least on the first QoS parameter value included in the received E-RAB SETUP REQUEST, transmit a high penetration alert signal to the first UT.

11. The communication network of claim 10, wherein the instructions further cause the processors to, in response to receiving the E-RAB SETUP REQUEST and before transmitting the high penetration alert signal, transmitting an ordinary paging signal to the first UT.

12. The communication network of claim 10, wherein the first QoS parameter value is QoS class indicator value or an Allocation and Retention Policy (ARP) value.

13. The communication network of claim 10, wherein the instructions further cause the processors to:
determine that a second UT is in the second state;
determine, as a result of the second UT being inactive while the second UT is in the second state, that the second UT is in the third state;
determine, as a result of the second UT being inactive while the second UT is in the third state, that the second UT is in a fourth state;
receive a first request to establish a second multimedia session with the second UT;
transmit, in response to receiving the first request and the second UT being in the fourth state, a S1AP Paging request including a Paging Priority value indicating the second multimedia session is suitable for a high penetration alerting procedure;
receive the S1AP Paging request; and
in response to receiving the S1AP Paging request, and based on at least the Paging Priority value included in the received S1AP Paging request, transmit a high penetration alert signal to the second UT.

14. The communication network of claim 10, wherein:
the instructions further cause the processors to generate, by a PCRF, a Policy and Charging Control (PCC) rule including a QoS parameter value indicating the first multimedia session is suitable for the high penetration alerting procedure; and
the transmitting a high penetration alert signal to the first UT is further in response to the PCC rule indicating that the first multimedia session is suitable for the high penetration alerting procedure.

15. The communication network of claim 10, wherein the instructions further cause the processors to:
retrieve, in response to receiving the first request, user profile data for a user of the first UT; and
determine that the first multimedia session is suitable for the high penetration alerting procedure based at least on the retrieved user profile data.

16. The communication network of claim 10, wherein the instructions further cause the processors to:
select one of a plurality of degrees or levels of increased amplitude for the high penetration alert signal relative to an ordinary paging signal;
include a second QoS parameter value in the transmitted E-RAB SETUP REQUEST, the second QoS parameter value indicating the selected degree or level; and
adjust an amplitude of the transmitted high penetration alert signal based at least on the second QoS parameter value included in the received E-RAB SETUP REQUEST.

17. The communication network of claim 10, wherein:
the instructions further cause the processors to determine, based at least on the first request, that the first multimedia session is for an emergency; and
the first QoS parameter value included in the transmitted E-RAB SETUP REQUEST is selected in response to the determination that the first multimedia session is for an emergency.

18. The communication network of claim 10, wherein the instructions further cause the processors to:
determine that the first UT has frequently required use of high penetration alerting for the first UT to receive paging; and
reduce, based on the determination that the first UT has frequently required use of high penetration alerting for the first UT to receive paging, a number of transmissions of ordinary paging signals transmitted to the first UT in response to receiving the E-RAB SETUP REQUEST prior to the transmission of the high penetration alert signal.

* * * * *